US012450850B2

(12) United States Patent
Leyton et al.

(10) Patent No.: US 12,450,850 B2
(45) Date of Patent: Oct. 21, 2025

(54) ADAPTIVE VIRTUAL OBJECTS IN AUGMENTED REALITY

(71) Applicant: Sony Interactive Entertainment Europe Limited, London (GB)

(72) Inventors: Pedro Federico Quijada Leyton, London (GB); David Erwan Damien Uberti, London (GB); Lloyd Preston Stemple, London (GB); Aron Giuseppe Visciglia, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 205 days.

(21) Appl. No.: 18/222,969

(22) Filed: Jul. 17, 2023

(65) Prior Publication Data

US 2024/0029378 A1     Jan. 25, 2024

(30) Foreign Application Priority Data

Jul. 25, 2022 (GB) ...................................... 2210866

(51) Int. Cl.
*G06T 19/00* (2011.01)
*G06T 19/20* (2011.01)

(52) U.S. Cl.
CPC ............ *G06T 19/20* (2013.01); *G06T 19/006* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 10,026,229 B1 | 7/2018 | Yalniz et al. | |
| 11,157,740 B1 * | 10/2021 | Agarwal | G06F 3/04845 |
| 2013/0278633 A1 | 10/2013 | Ahn et al. | |
| 2014/0204118 A1 | 7/2014 | Berry et al. | |
| 2019/0251753 A1 | 8/2019 | Canada et al. | |
| 2020/0066045 A1 | 2/2020 | Stahl et al. | |
| 2020/0151965 A1 | 5/2020 | Forbes et al. | |
| 2020/0226823 A1 | 7/2020 | Stachniak et al. | |
| 2020/0234498 A1 | 7/2020 | Price et al. | |

FOREIGN PATENT DOCUMENTS

| | | |
|---|---|---|
| WO | 2021188551 A1 | 9/2021 |
| WO | 2022/101707 A1 | 5/2022 |

OTHER PUBLICATIONS

UK IPO Combined Search and Examination Report received in Application No. GB2210866.6, date of search Jan. 26, 2023, in 8 pages.
Extended European Search Report received in Application No. EP 23186614.6, dated Nov. 28, 2023, in 8 pages.
EP23186614.6, "Intention to Grant", Apr. 22, 2025, 8 pages.

* cited by examiner

*Primary Examiner* — Martin Mushambo
(74) *Attorney, Agent, or Firm* — Kilpatrick Townsend & Stockton LLP

(57) ABSTRACT

A computer-implemented method includes selecting a virtual object to be positioned in a mixed-reality environment, the virtual object having one or more conditions relating to the positioning of the virtual object, scanning a real-world part of the mixed-reality environment, determining a location to position the virtual object based on the scan, wherein the location satisfies the one or more conditions, scaling the virtual object based on the location, and positioning the virtual object in the mixed-reality environment at the determined location.

20 Claims, 7 Drawing Sheets

ADAPTIVE VIRTUAL OBJECTS IN AUGMENTED REALITY

CROSS-REFERENCE TO RELATED APPLICATIONS

This application claims priority to United Kingdom Patent Application No. GB2210866.6, filed Jul. 25, 2022, the contents of which are incorporated herein by reference.

FIELD

The present disclosure relates to a computer-implemented method for adapting virtual objects in an augmented reality environment.

BACKGROUND

In mixed-reality, the real world and the virtual world work together to create an augmented reality environment. It is desirable to create a seamless transition between the virtual and real-world parts of the environment that a user is experiencing.

Images are displayed virtually, which may overlap or coincide with the real-world. This can include, for example, displaying virtual objects (e.g. three dimensional interactive images) on tabletops, walls, chairs and floors of the real-world environment.

SUMMARY

Aspects of the invention are set out in the independent claims, further features according to embodiments are set out in the dependent claims.

According to a first aspect, there is provided a computer-implemented method. The method comprising the following steps. Firstly, selecting a virtual object to be positioned in a mixed-reality environment, the virtual object having one or more conditions relating to the positioning of the virtual object. Then, scanning a real-world part of the mixed-reality environment. The method further comprises determining a location to position the virtual object based on the scan, wherein the location satisfies the one or more conditions. After determining a location, the method comprises scaling the virtual object based on the location and finally, positioning the virtual object in the mixed-reality environment at the determined location. Determining the location may comprise comparing the real-world environment with the conditions relating to positioning of the virtual object. The comparison may be performed continuously or at intervals, for example during or after the scanning process.

Advantageously, by scanning the local environment, a virtual object can be adapted to be placed in the mixed-reality (e.g. augmented reality) according to the space within the immediate environment of a user. As such, flexibility is provided to place the virtual object in a suitable location. The user has a more immersive experience as a result. Scaling of the virtual object provides additional flexibility to adapt the virtual object to the local real-world environment to enhance the overall mixed-reality experience of the user. Positioning the virtual object according to one or more conditions provides further improvements to the overall user experience, including the look and feel of the mixed-reality environment which may more closely mimic a real-world experience.

In some embodiments, a condition of the one or more conditions may comprise positioning the virtual object in a space according to a bounding box of the virtual object. The bounding box may comprise a scalable volume of the virtual object. Optionally, scaling the virtual object can be based on the bounding box.

In some embodiments, a condition of the one or more conditions may comprise locating the virtual object a type of plane. A type of plane may be defined as the surface of, for example, a table, a chair, a floorspace or a wall.

In some embodiments, a condition of the one or more conditions may comprise a proximity of the virtual object to one or more other objects in the mixed-reality environment. For example, the condition may specify that the object should be placed a certain distance away from a television, other appliance, wall, etc. present in the real-world environment. The condition may also or alternatively specify proximities of certain virtual objects in relation to each other to be displayed in the virtual part of the mixed-reality environment.

In some embodiments, a condition of the one or more conditions may comprise position and/or rotation of the virtual object. For example, some virtual objects may be limited to certain orientations, whilst others may have more flexibility to adapt to the local real-world environment.

In some embodiments, a condition of the one or more conditions may comprise specifying lighting conditions into which the virtual object can be placed. Lighting conditions may include, for example, placing the virtual object under spotlight, near a window, etc.

In some embodiments, a condition of the one or more conditions may comprise a distance to position the virtual object away from a user. For example, the condition may specify a minimum or maximum distance for the virtual object to appear to a user to be placed in the mixed-reality environment.

In some embodiments, scanning can be performed using Simultaneous Location and Mapping, SLAM. SLAM provides information about the local real-world environment, for example detecting surfaces (e.g. planes).

In some embodiments, scanning may comprise a first scan and a second scan. The two scans may be combined to create a more accurate measurement of the real-world environment. The first scan may determine the location and the second scan may be based on the location determined by the first scan. The second scan may determine a topography of the real-world landscape of the location. In some examples, the method may further comprise creating a mesh relating to the topography. Optionally, further comprising adapting the virtual object according to the mesh. Adapting the virtual object may comprise adjusting the topography of the landscape of the virtual object. This may include representing peaks and/or troughs in the virtual image which are corresponding to those present in the real-world. In this way, the virtual landscape of the image comprising the virtual object can be mapped directly onto the landscape of the real-world according to the user's view of the environment to create a seamless transition between the user's perception of the virtual and real-world parts of the mixed reality environment.

In some embodiments, the first scan can be performed using Simultaneous Location and Mapping, SLAM, and the second scan can be performed using Light Detection and Ranging, LIDAR.

In some embodiments, the method may further comprise indicating to a user one or more locations that satisfy the conditions.

In some embodiments, the method may further comprise: scanning a second real-world part of the mixed-reality environment that is different to the first real-world part of the mixed-reality environment; determining a second location to position the virtual object in the second real-world part of the mixed-reality environment based on the scan, wherein the location satisfies the one or more conditions; scaling the virtual object based on the second location; and positioning the virtual object in the second mixed-reality environment at the second determined location. The method may be applicable to multiple users in different real-world environments.

In some embodiments, the bounding box may be determined by a comparison between the first and second real-world parts of the mixed reality environments such that the scaling of the virtual object is consistent between them.

According to a second aspect, there is provided a computer program product including one or more executable instructions which, when executed by a computer, causes the computer to carry out the method according to the first aspect.

According to a third aspect, there is provided a system comprising a processor configured to implement the method steps according to the first aspect, a memory and a mixed-reality display device.

BRIEF DESCRIPTION OF DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

Figure 1:
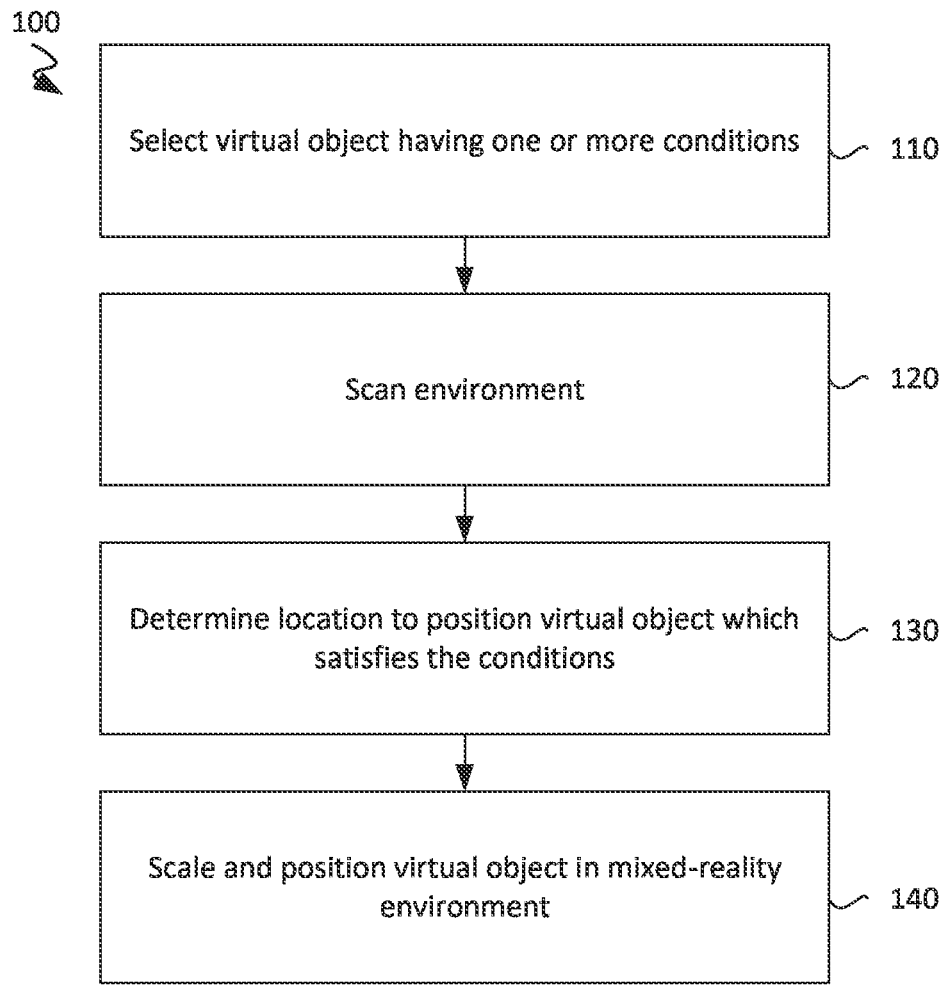
FIG. 1 illustrates a flow diagram of a method according to an embodiment of the disclosure.

FIG. 1 illustrates a flow diagram of a computer-implemented method 100 according to an embodiment of the disclosure. The method is for placing (or positioning) a virtual object in a mixed-reality environment according to one or more conditions.

According to a first step 110, a virtual object (e.g. an image which may be a three dimensional, 3D, image) is selected having one or more conditions, the conditions relating to the positioning of the object in an augmented reality or mixed-reality environment. The object itself is virtual, however, its placement, position or location in the mixed-reality setting is based primarily on the real-world environment. This creates an augmented reality experience for a user, which is different to completely virtual or completely real-world environments. The virtual and real parts of the mixed-reality should work together seamlessly so that the users experience is continuous.

The conditions for positioning the virtual object comprise one or more of, but not limited to, the following:

a bounding box of the virtual object comprising a volume that the virtual object will occupy;
 a type of plane to position the virtual object onto;
 proximity of the virtual object to one or more other objects (either virtual or real-world objects) in the mixed-reality environment;
 position and rotation of the virtual object;
 lighting conditions; and/or
 distance to position the virtual object away from the user.

The bounding box will be described further in relation to FIG. 3. The function of the bounding box is to specify a volume that the virtual object will occupy in 3D space. The system ensures that the volume of the object will fit into an area.

A plane is a substantially flat (e.g. planar) surface, which in some examples can be defined horizontally. A plane is not limited to being a horizontal surfaces and may include other substantially planar surfaces such as walls, for example, which are vertical.

A type of plane describes the type of surface e.g. a classification of the plane, which may for example be a table, a chair, a floor, a wall, etc. A type of plane may be a condition that can be specified, to indicate to the system where to position the virtual object. For example, a condition of the virtual object may specify that it is to be placed on a surface of a table.

Conditions may specify that the virtual object is to be displayed with a certain orientation (e.g. position and rotation, also called pose). Pose can be adjusted within the limitations specified by the virtual object. In an example, if the virtual object is a sofa or chair, a condition concerning the pose of the sofa or chair might be that it must face away from a wall and be placed against the wall such that the back of the sofa or chair is parallel with the wall.

In some examples, lighting conditions may be specified by the virtual object. For example, the virtual object may specify a condition to be placed under a spotlight, near a window, or to be front-lit.

It will be appreciated that the conditions which the selected virtual object specifies can have many variations.

According to a second step 120, the environment is scanned. The environment to be scanned is the real-world environment. Scanning comprises traversing surfaces with a beam (e.g. an electromagnetic beam) to detect features in the range of the beam, the features relating to articles of the environment such as objects including walls, floors, ceilings, tables, chairs, etc. Scanning provides the system with physical information of the local environment of a user to determine one or more locations where the virtual object could be placed.

Scanning is performed by one or more scanning devices or sensors configured to provide the relevant information concerning the local environment of a user. In some examples, scanners or sensors may include a visual device, such as a lens or a camera and/or other sensors such as Light Detection and Ranging (LIDAR). The scanning devices may form part of a virtual-reality headset which the user wears to facilitate displaying the augmented reality environment. The scan may be performed in 360 degrees around a user, for example as a user moves around the real-world environment. For example, where the mixed-reality display device is a head mountable display (HMD), the lens which tracks the input device may be through a camera mounted on or integral to the HMD and worn on the user's head. In other examples, the input device may be tracked from a camera mounted on a display device such as a monitor or television screen.

Figure 7:
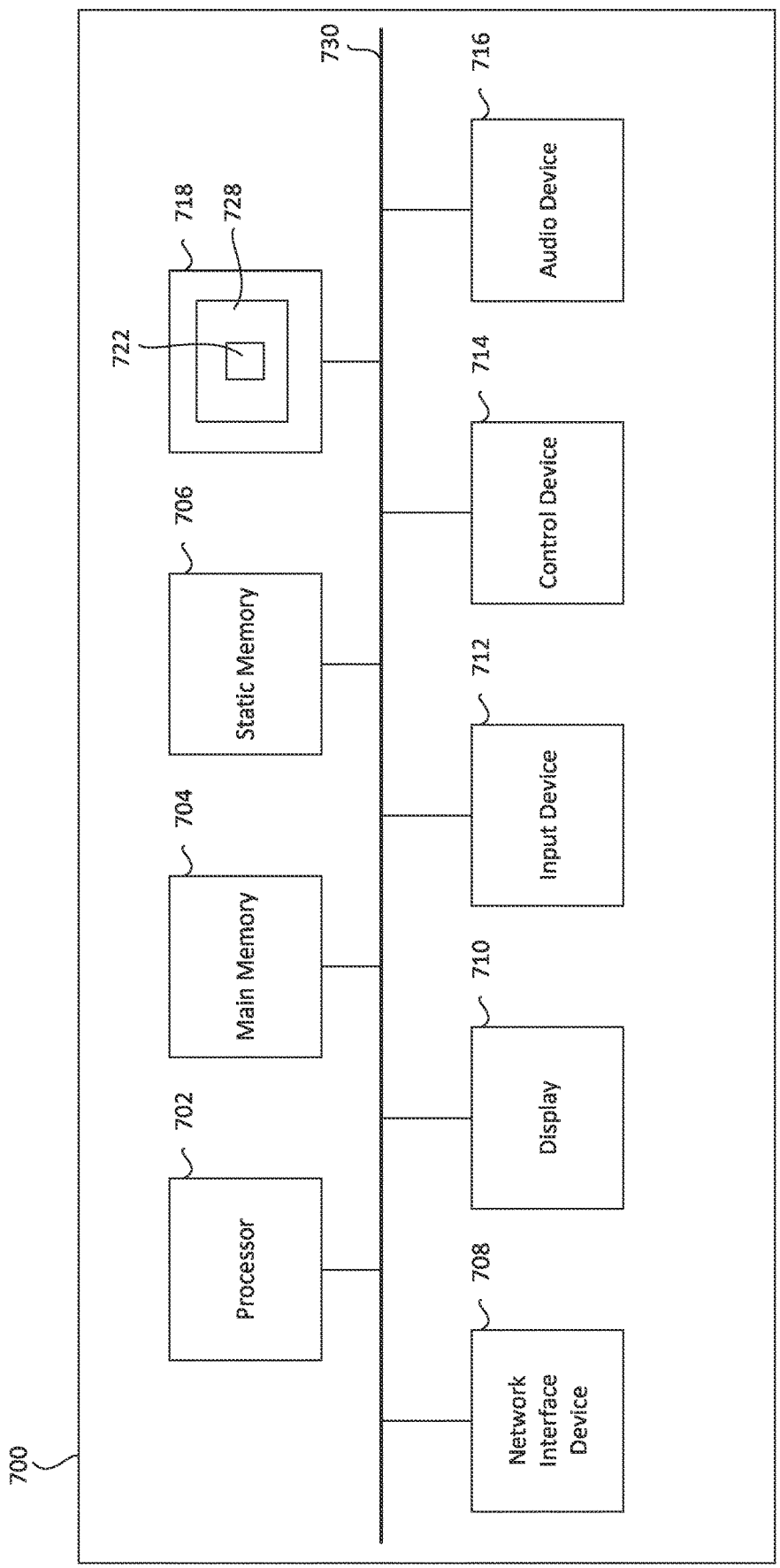
FIG. 7 shows schematically an example of a cloud gaming system that may be used in accordance with the present disclosure.

In some examples, information measured by the scan can be received at a virtual reality headset. Scan information may include camera data and/or sensor data comprising accelerometers and/or gyroscopes of the one or more devices used in the scanning system. Processing of the scan information may be performed at a processor which is part of central processing system such as a computing device, for example as illustrated in FIG. 7. In other examples, tracking information can be received from one or more external sources. For example, tracking information can be received by edge computing where an external camera handles the tracking information with dedicated hardware.

Simultaneous Location and Mapping (SLAM) is used to provide information about the local physical space. SLAM is the computational problem of constructing or updating a map of an unknown environment while simultaneously keeping track of a user's location within the environment. There are several algorithms known for solving it, at least approximately, in tractable time for certain environments. Approximate solution methods include the particle filter, extended Kalman filter, covariance intersection, and GraphSLAM. SLAM algorithms are based on concepts in computational geometry and computer vision, and can be used for virtual reality or augmented reality.

SLAM can be used in some examples to detect planes and types of plane which are two dimensional (2D) in the real-world environment local to a user. As the environment is scanned, the system can optionally label the different planes as they are detected, for example indicating that a plane is a tabletop, wall etc. In some examples, plane information may be displayed via a virtual image in the augmented reality display to provide the information concerning types of plane to a user. In some examples, locations of objects (real or virtual) or planes in the environment may be stored in a memory of the system for future reference.

In some examples, one or more scanning techniques can be used in combination to provide a more accurate scan of the real-world environment. In one example, LIDAR can be used in combination with one or more cameras/lenses that are implementing SLAM. LIDAR scanners are lightweight so can form part of a virtual reality headset. A more intensive scan can be performed using LIDAR compared to SLAM, which provides a greater detail of information about the surfaces being scanned.

Whilst the virtual part of the virtual part of the mixed-reality location may not be scanned as such, knowledge about virtual objects and their placements in the context of the real-world part of the environment may be known and/or combined.

According to a third step 130, a location to position the virtual object is determined which satisfies the conditions of that virtual object. The location is defined somewhere within the range of the scan environment and provides a place that the virtual object is to be positioned in the virtual part of the environment. The location should satisfy all the conditions that have been specified for the virtual object in order for it to be positioned and should also coincide with the features and objects present in the real-world part of the environment. For example, the location may include a real-world surface onto which the virtual object, once placed, appears to be directly on top of (e.g. not floating above the surface or cutting through it). The system may compare information provided by the scan, e.g. information provided by SLAM, with information about the conditions associated with the virtual object and provide a determination concerning the suitability of an area for the virtual object to be placed. This determination can be made dynamically as the scan is being performed.

In some examples, a visual aid in the form of a virtual image may be presented to the user to indicate suitable locations to place the object as the user scans the environment. In one example, an area or plane may appear to the user to be highlighted in green if the location is suitable for the virtual object or red if it is not.

According to a fourth step 140, a scale and position of the virtual object are determined, and the object is placed in the mixed-reality environment. The virtual object can be scaled based on the chosen location, for example to fit the location which satisfies the conditions. Being able to dynamically adjust the scale is beneficial in that the virtual object can be adapted to the real-world environment; it can be placed in any suitable location which satisfies the specified conditions for that virtual object. Scaling of the virtual object can be performed according to a bounding box which defines the ratio of length, width and depth of the virtual object to be displayed. The bounding box ensures that the dimensions of the virtual object are not distorted when displayed in the mixed-reality environment such the image appears as intended.

There may be two further conditions relating to the scale of the virtual object that determine whether an object can be successfully placed in the mixed-reality environment after it has been initially placed over a plane. These include:
1) The bounding box's volume of the object should fit completely inside the plane of the selected location; and
2) The bounding box should not be intersecting any other plane.

If these conditions are not met after an initial placement, the object can be scaled until the conditions are fulfilled. Scaling may be performed on a per frame basis.

In some embodiments there may be more than one user (e.g. player) in more than one environment, for example in a multi-user or multi-player game. In these embodiments comprising multi-users, steps one to four can be completed in parallel for each of the users.

Consistency can be maintained between users by determining the space available to each user and adapting the experience accordingly. For example, some users may have an environment which are on a larger/smaller scale to others, some environments may not have tables the same number of household items or different types of household items in the environment, may have additional features, or differing amounts of floor space etc.

A comparison can be made based on users differing available space in the real-world environment by data collected at (e.g. sent to) a central processor. This comparison could be performed by comparing numbers of planes scanned in the environment, plane sizes, or other volumetric data received, for example through scanning and historical data of the users local environment.

After a comparison has been made, a determination can be made about which space is the most restricted of all the users since this will provide limitations of size, scale and location placements of virtual objects if they are each to share the same experience. Virtual objects to be placed in the virtual part of the mixed-reality environment may be scaled according to the most restricted of the users' available areas. This helps to ensure that the users all have a similar experience, for example by interacting with identical virtual objects. Calculations to determine a suitable size, scale and location of virtual objects may take into consideration a level of interaction between the user and the virtual object (e.g. if it for observation only or whether the user interacts physically with the virtual object, etc.) to maintain the integrity of the intended interaction between the user and the virtual object.

In some examples, depending on the object to be placed and any conditions associated therewith, a wall may be specified as a useable space if no tabletop space is available for one of the users. Further constraints may limit the amount by which an object can be scaled, for example if interaction with the virtual object is through using a hand (i.e. the scale should not be so small that a human hand could no longer interact with the mixed-reality experience in the intended way).

Figure 2A:
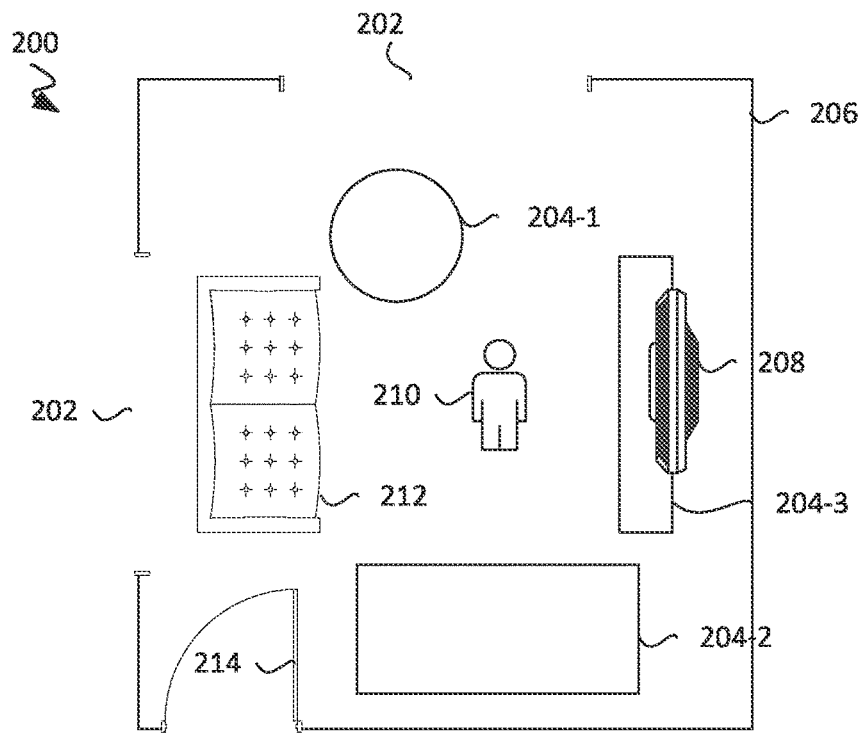
FIGS. 2A and 2B illustrate a schematic diagram of an example environment within which the present disclosure could be used.
Figure 2B:
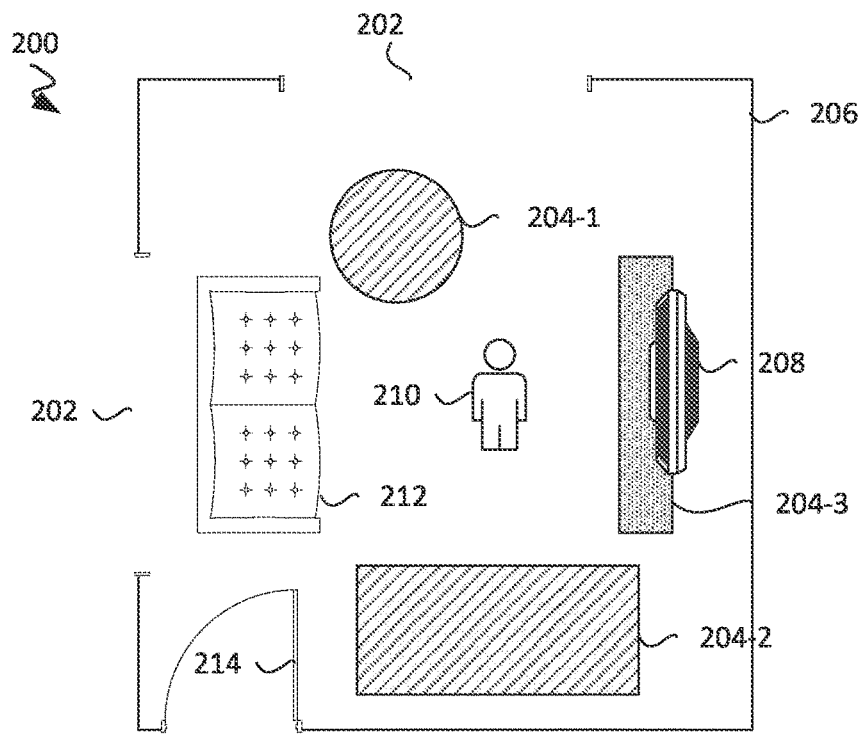

FIGS. 2A and 2B illustrate a schematic diagram of an example environment 200 within which the present disclosure could be used. The illustrated environment comprises windows 202, walls 206, a door 214, a chair or sofa 212, tables 204-1, 204-2, 204-3 a television or display unit 208 and a user 210. Also present but not illustrated is a computing device or system comprising a processor and memory.

The user 210 wears an augmented reality (AR) headset (also called a virtual reality (VR) headset) which is in communication with a computing device. The AR/VR headset comprises one or more scanning devices, such as a camera, and is configured to display a virtual image to the user. The image to be displayed to the user includes one or more virtual objects according to the present disclosure. In a mixed-reality setting virtual image(s) are displayed on top of, or in combination with, the real-world environment of the user.

As the user 210 moves about the environment 200, the AR/VR headset scans the environment with one or more scanning device(s). As the scanning takes place, the system detects planes, including those of the tables 204-1, 204-2, 204-3, chair 212 and walls 206. In some examples, scanning may be a continuous process, whilst in other examples, scanning may be performed at intervals. Information measured by the scanning can be stored at a memory of the system, for example to reduce the amount of scanning performed by the system.

One example of the present disclosure comprising an image in the augmented reality environment 200 is illustrated in FIG. 2B. In this example, the virtual object has been assigned a condition that specifies that it should be positioned on a plane which is a tabletop, and which has a minimum space requirement. The system detects the planes of tables 204-1, 204-2 and 204-3 during the scanning stage. Tables 204-1 and 204-2 are highlighted as possible locations for the virtual object to be placed. This is visible to the user through the use of image projections onto the tables 204-1, 204-2. The system recognises that table 204-3 is a table having a plane that is a tabletop but the area does not fulfil the minimum space requirement condition of the positioning of the virtual object due to its dimensions and so is highlighted in a different way to indicate to the user that it is not a suitable location for the virtual object to be positioned in the mixed-reality environment 200.

The user may be able to choose from the suitable tables 204-1, 204-2 where they would prefer the virtual object to be. Or, the virtual object may simply appear as an image in the virtual part of the mixed-reality image if the conditions specified by the virtual object are met. The virtual object scales accordingly to the one or more locations that satisfy the conditions.

Figure 3:
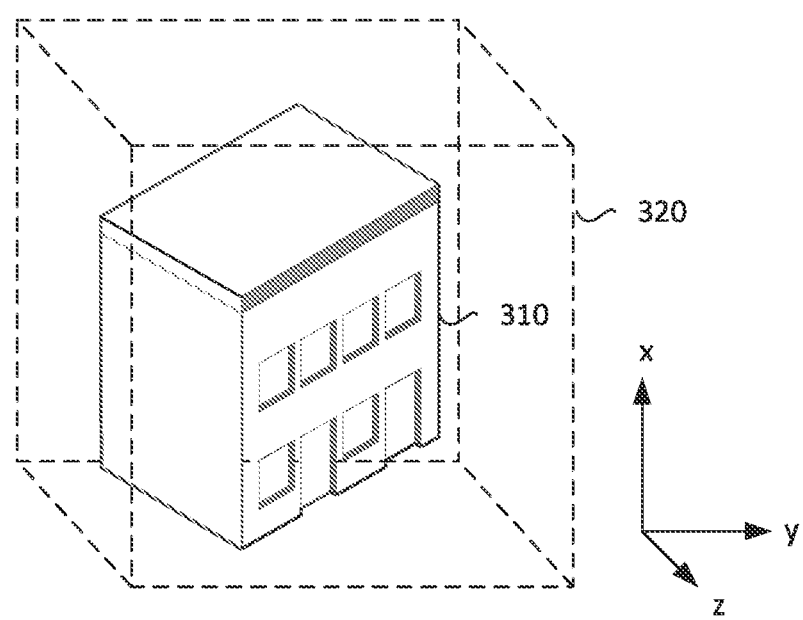
FIG. 3 illustrates a virtual object in a bounding box.

FIG. 3 illustrates a virtual object 310 and its bounding box 320. The bounding box 320 comprises a volume required to place the virtual object in the augmented reality environment. In the illustrated example of FIG. 3, the bounding box 320 is close to the edges of the virtual object 310 but in other examples the bounding box 320 can be larger, for example to ensure that when the object is placed there is space between the virtual object and any walls, or edges of the plane in which the virtual object is positioned. The bounding box 320 provides information about the boundaries of the display of the virtual object.

The bounding box 320 can also be referred to as a 3D mesh. A mesh defines boundaries of the image within which the image will be displayed. The bounding box 320 ensures that the dimensions of the virtual object 310 are maintain, and not stretched or compressed for example. This may improve the user experience of interacting with the virtual object 310.

In multi-user examples, the bounding box of a virtual object may be determined by restrictions made resulting from comparisons of users' different environments. The bounding box may be consistent for each of the users such that the virtual object that the users experience is the same for each of them.

Figure 4A:
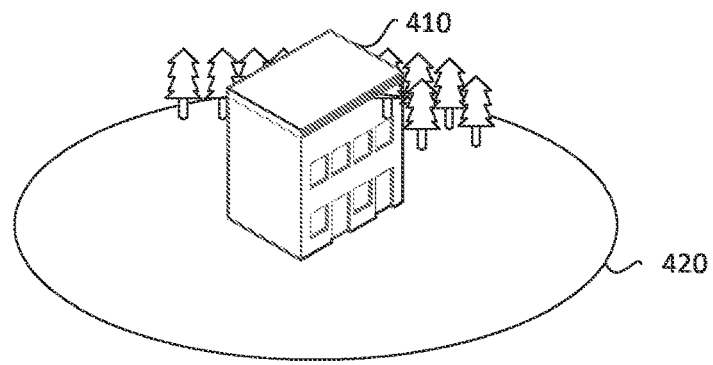
FIGS. 4A to 4C illustrate a virtual object provided in an augmented reality environment.
Figure 4B:
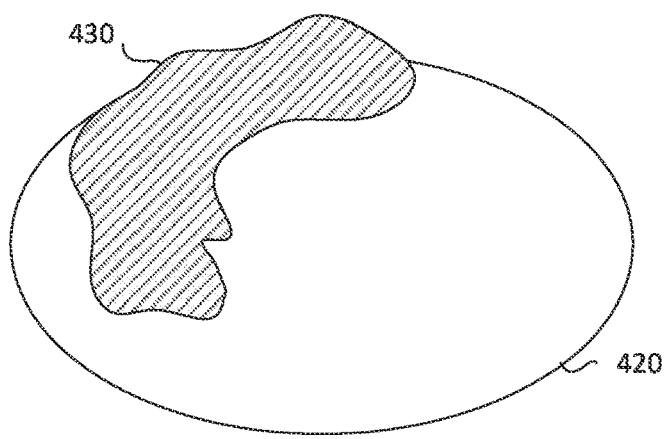
Figure 4C:
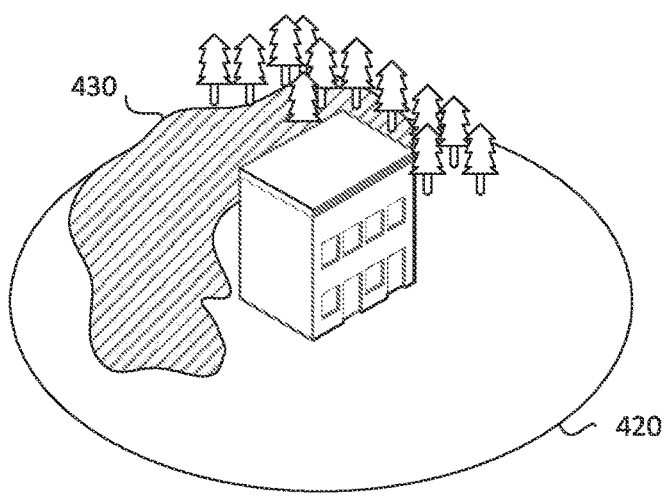

FIGS. 4A to 4C illustrate a virtual object 410 provided in an augmented reality environment. FIG. 4A shows the virtual object 410 positioned on a plane 420 which satisfies the virtual object conditions. The plane 420 may be a tabletop, for example, which has a flat surface. In the illustrated example of FIG. 4A, the virtual object 410 comprises an image having a building and a group of trees which are positioned behind the building. It will be appreciated that this is merely an example and the subject-matter of the virtual object is arbitrary in the context of the present disclosure.

A mesh which defines the boundaries of the virtual object has a base. The base of the mesh in this example is planar, which matches the surface that the virtual object is positioned onto in this example (e.g. the flat tabletop).

FIG. 4B illustrates an example of a mesh having a non-planar base topography that the virtual object 410 will be adapted to and displayed according to an embodiment of the present disclosure.

The non-planar mesh is generated by scanning the real-world part of the mixed-reality environment, which itself is non-planar. In some examples, this comprises scanning the area of the real-world location chosen to position the object using a combination of techniques. In the illustrated example of FIG. 4B, the raised topography 430 of the mesh results from one or more objects which are present in the real-world environment.

The mesh that is generated by the scanning techniques can be used in the context of the augmented reality environment and the virtual object. The virtual image comprising the virtual object can be modified to fit the mesh based on the real-world environment and real-world objects that are present (e.g. bottles, clothing and other soft furnishings etc. on a tabletop surface) and create a topography on an otherwise substantially planar surface in the real-world part of the mixed-reality environment, for example the surface of a table.

A first scan comprises information about the real-world objects in the environment. The first scan detects planes, for example 2D planes, in the real-world part of the mixed-reality environment including surfaces such as tabletops, walls and floors. In one example, the first scan can be performed using SLAM, which detects edges of real-world objects and defines a plane having an area in relation to these edges.

A second scan may be a more accurate scan than the first scan that can be used to improve a level of detail of information concerning the area of the plane, for example onto which the virtual object can then be positioned. The second scan provides a more detailed relief (e.g. topography or landscape) in 3D of the real-world part of the mixed-reality environment according to a chosen plane area detected by the first scan. The second scan measures a height of one or more real-world objects located within the edges of the chosen plane and may further improve an accuracy of edge location. In some examples, the second scan is performed using Light Detection and Ranging (LIDAR).

An area to be scanned by the second scan can be determined by the first scan. This process acts to reduce the computer processing required for the second scan by selectively determining the area which is to be scanned during the second scan based on the first scan. The second scan is more computationally expensive than the first scan, so limiting the second scan to the area determined by the first scan can help to reduce the processing power required.

FIG. 4B illustrates a mesh comprising a plane 420 and a topography 430 which is non-planar and sits on top of the flat surface of the plane 420. The non-planar part, i.e. the topography, is illustrated in FIG. 4B as a shaded region. The mesh itself comprises the planar and non-planar parts. The plane 420 is determined by the first scan and the topography 430 is determined by a second scan in the region of the plane 420.

It will be appreciated that in some embodiments, a single scan may be performed to achieve the mesh illustrated in FIG. 4B.

Scans of the real-world environment can be combined with the virtual-world to create a mixed-reality experience for a user present in the environment. The virtual object can be adapted in the virtual part of the mixed-reality environment to be harmonious with the real-world part of the mixed-reality environment including the topography of the real-world. In this way, the user can experience a mixed-reality environment (or augmented reality) that is closely related to the real-world part of the augmented reality.

FIG. 4C illustrates a combination of the virtual object 410 illustrated in FIG. 4A with the mesh created in FIG. 4B comprising the plane 420 and the topography 430. In FIG. 4C, the building of the virtual image 410 remains on the planar surface 420. The trees which are positioned behind the building in FIG. 4A, however, are adapted according to the mesh such that they are positioned according to the height of the mesh at their specified location. Accordingly, some of the trees of the virtual object in the virtual part of the mixed-reality environment that were hidden behind the building when the mesh was planar in FIG. 4A can now be seen on a "hill" in the virtual image. The height and positioning of each tree in the virtual part of the mixed-reality environment is calculated according to the mesh i.e. the corresponding topography 430 determined by scanning the real-world part of the mixed-reality environment.

It will be appreciated that the example virtual objects, positioning, topography and planes illustrated in FIGS. 2 to 4C are provided for illustrative purposes only and that there is a large number of variations which are comprises with the context of the present disclosure.

Figure 5:
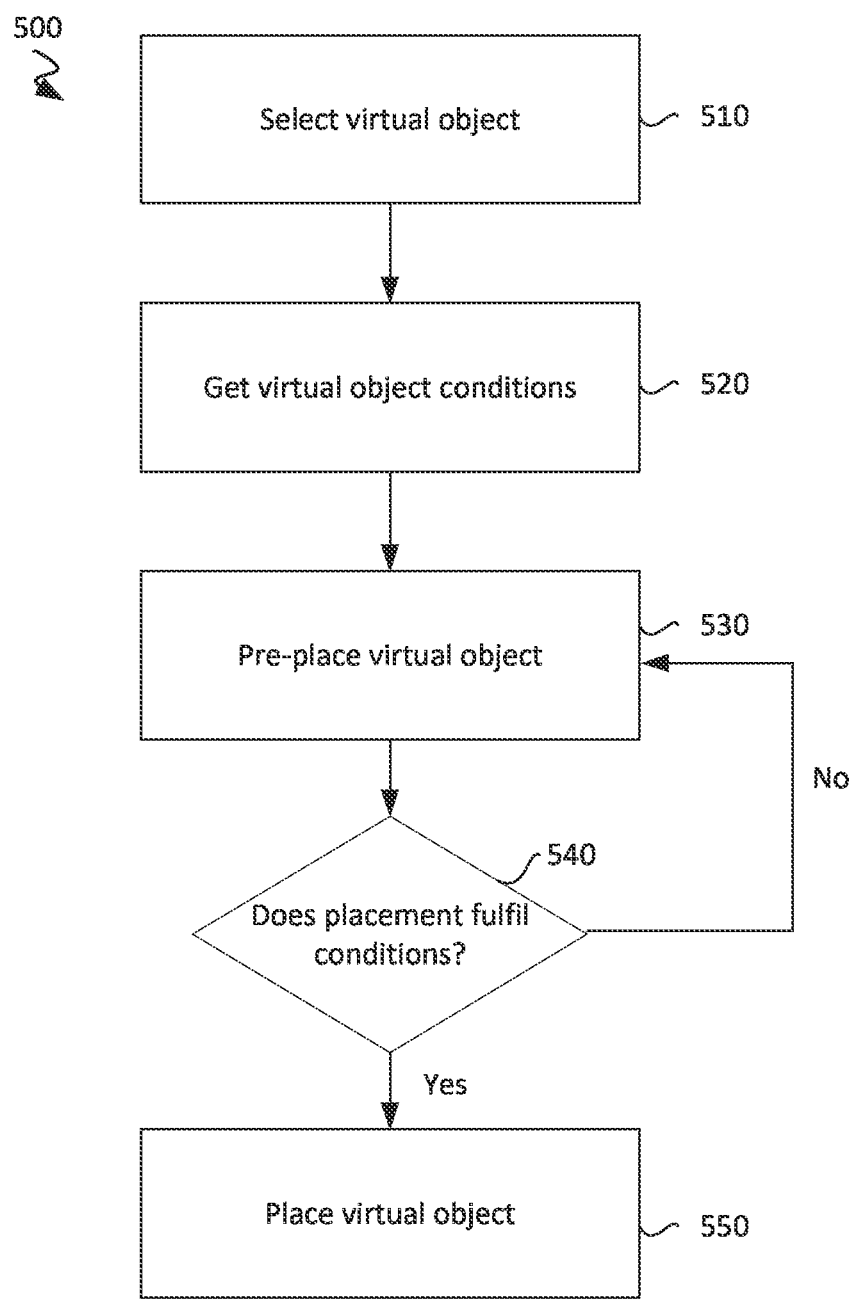
FIG. 5 illustrates a flow diagram of a method of placing a virtual object in an augmented reality environment.

FIG. 5 illustrates a flow diagram of a method 500 for placing a virtual object in an augmented reality environment.

According to a first step 510, a virtual object to be displayed in an augmented reality is selected. The object may be any type of virtual object. The virtual object will be displayed in a virtual part of a mixed-reality environment, where a user may be able to see the virtual object as being imposed on the real-world environment of the user.

In a second step 520, one or more conditions of displaying the virtual object in the augmented reality environment are retrieved. These conditions are specific to different virtual objects and can be stored, for example along with the virtual object, as instructions in a memory connected to the display system. Examples of the conditions which a virtual object may specify are listed above in relation to FIG. 1.

In a third step 530, the virtual object is pre-placed in the augmented reality environment. Pre-placing the virtual object can be achieved using SLAM to detect possible suitable locations.

In a fourth step 540, the system determines if the conditions are fulfilled at the pre-placed location. This step may also be performed using SLAM. If the conditions are fulfilled, the method moves onto the next step 550. If the conditions are not fulfilled at the pre-placed location, the method moves back to step 530 to pre-place the virtual object at a different location. In some examples, an indication may be made to the user (via the virtual display) to indicate whether the conditions are fulfilled or not. The indications may appear to the user as textual or visual information. In other examples, the system may not display locations to the user which do not fulfil the requirements.

In step 550, the virtual object is placed in the mixed-reality environment. The user may interact with the virtual object in the mixed-reality environment once it has been successfully placed according to the conditions it specifies. SLAM may be used to help maintain the virtual object in the chosen/dedicated position.

Figure 6:
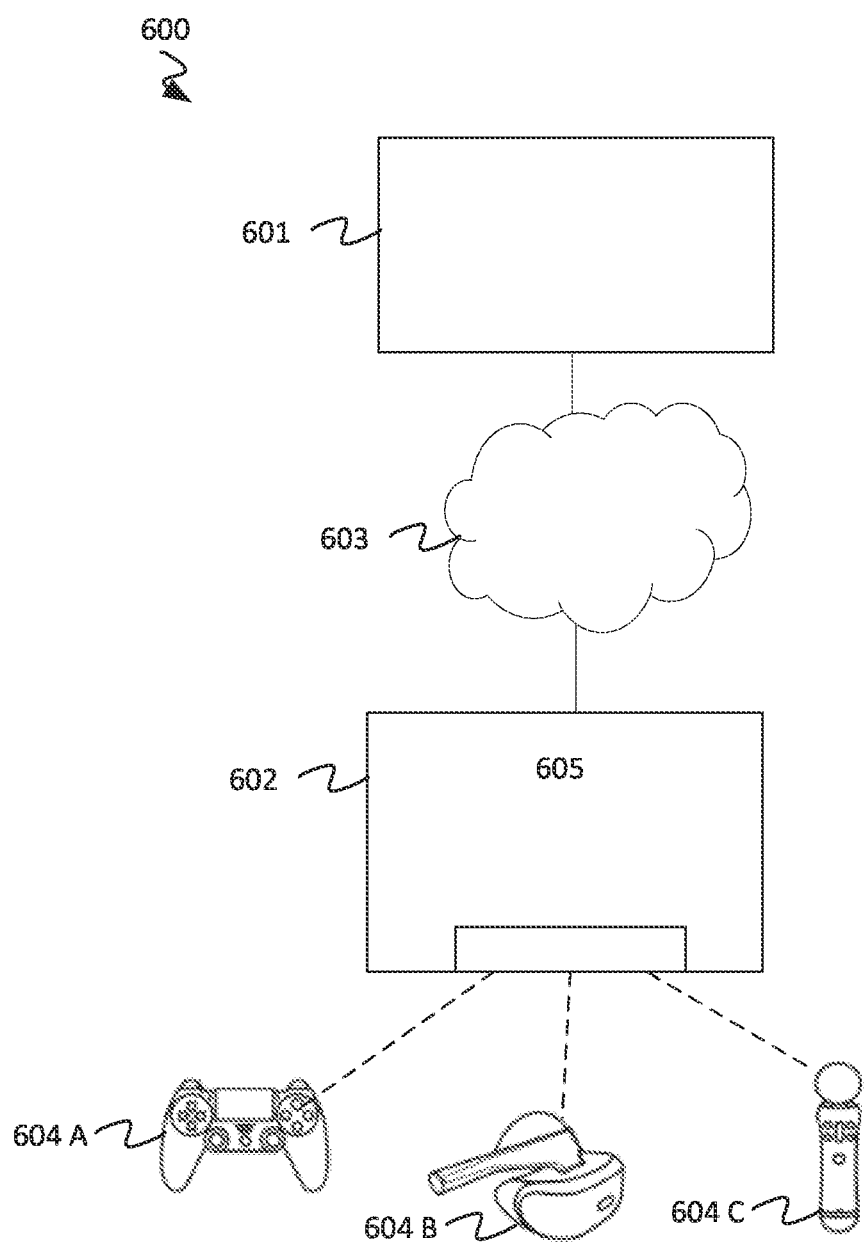
FIG. 6 illustrates a block diagram of one example implementation of a computing device.

FIG. 6 shows schematically an example of a cloud gaming system 600 that may be used in accordance with the present disclosure. In FIG. 6, the cloud gaming system 600 is shown as comprising a server 601 that is in communication with a client device 602 via a communications network 603. The server 601 may be configured to perform at least some of the rendering of the virtual object as described above.

The client device 602 may include, e.g. a video game playing device (games console), a smart TV, a set-top box, a smartphone, laptop, personal computer (PC), USB-streaming device (e.g. Chromecast), etc. The client device 602 may receive e.g. video frames from the server 601, via the communications network 603. In some examples, the client device 601 may receive image data from the server 601 and perform further processing on that image data. The image data may comprise instructions about a virtual object and/or the conditions associated with that virtual object. The client device further comprises a VR/AR headset for displaying the virtual object to a user.

In FIG. 6, the client device 602 is shown as being associated with a plurality of input devices 604A (DualShock 4®), 604B (PS VR® headset), 604C (PS Move® Controller). It will be appreciated that the input devices 604A, 604B, 604C shown are merely illustrative examples and that a different number of, and/or different types of input devices may be provided. The input devices are in communication with the client device via a wired or wireless connection. In FIG. 6, the client device 602 is shown as comprising a communication interface 605 for receiving user inputs generated at or via the input devices. It will be further appreciated that in some examples, user inputs may be generated at the client device 602 and not necessarily with a separate, standalone input device. For example, if the client device 602 is e.g. a smartphone or table with a touchscreen.

FIG. 7 illustrates a block diagram of one example implementation of a computing device 700 that can be used for implementing the steps indicated in FIG. 1 and explained throughout the detailed description. The computing device is associated with executable instructions for causing the computing device to perform any one or more of the methodologies discussed herein. The computing device 700 may operate in the capacity of the data model or one or more computing resources for implementing the data model for carrying out the methods of the present disclosure. In alternative implementations, the computing device 700 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random-access memory (DRAM) such as synchronous DRAM (SDRAM) or Rambus DRAM (RDRAM), etc.), a static memory 706 (e.g., flash memory, static random-access memory (SRAM), etc.), and a secondary memory (e.g., a data storage device 718), which communicate with each other via a bus 730.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the processing logic (instructions 722) for performing the operations and steps discussed herein.

The computing device 700 may further include a network interface device 708. The computing device 700 also may include a video display unit 710 (e.g., a liquid crystal display (LCD) or a cathode ray tube (CRT)), an alphanumeric input device 712 (e.g., a keyboard or touchscreen), a cursor control device 714 (e.g., a mouse or touchscreen), and an audio device 716 (e.g., a speaker).

The data storage device 718 may include one or more machine-readable storage media (or more specifically one or more non-transitory computer-readable storage media) 728 on which is stored one or more sets of instructions 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilising terms such as "providing", "calculating", "computing," "identifying", "detecting", "establishing", "training", "determining", "storing", "generating", "checking", "obtaining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the disclosure has been described with reference to specific example implementations, it will be recognised that the disclosure is not limited to the implementations described but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A computer-implemented method comprising:
    selecting a virtual object to be positioned in a mixed-reality environment, the virtual object having one or more conditions relating to the positioning of the virtual object;
    performing a first scan of a real-world part of the mixed-reality environment;
    determining, based on the first scan, a location to position the virtual object that satisfies the one or more conditions;
    performing a second scan of the real-world part of the mixed-reality environment;
    scaling, based on the location and the second scan, the virtual object; and
    positioning the virtual object in the mixed-reality environment at the location.

2. The computer-implemented method of claim 1, wherein a condition of the one or more conditions comprises positioning the virtual object in a space according to a bounding box of the virtual object.

3. The computer-implemented method according to claim 2 wherein scaling the virtual object is based on the bounding box.

4. The computer-implemented method according to claim 1, wherein a condition of the one or more conditions comprises locating the virtual object on a type of plane.

5. The computer-implemented method according to claim 1, wherein a condition of the one or more conditions comprises a proximity of the virtual object to one or more other objects in the mixed-reality environment.

6. The computer-implemented method according to claim 1, wherein a condition of the one or more conditions comprises position and/or rotation of the virtual object.

7. The computer-implemented method according to claim 1, wherein a condition of the one or more conditions comprises specifying lighting conditions into which the virtual object can be placed.

8. The computer-implemented method according to claim 1, wherein a condition of the one or more conditions comprises a distance to position the virtual object away from a user.

9. The computer-implemented method according to claim 1, wherein scanning is performed using Simultaneous Location and Mapping, SLAM.

10. The computer-implemented method according to claim 1, wherein the first scan is performed using Simultaneous Location and Mapping, SLAM, and the second scan is performed using Light Detection and Ranging, LIDAR.

11. The computer-implemented method according to claim 1, further comprising indicating to a user one or more locations that satisfy the conditions.

12. The computer-implemented method according to claim 1, further comprising:
    scanning a second real-world part of the mixed-reality environment that is different to a first real-world part of the mixed-reality environment;
    determining a second location to position the virtual object in the second real-world part of the mixed-reality environment based on the scan, wherein the location satisfies the one or more conditions;
    scaling the virtual object based on the second location; and
    positioning the virtual object in the mixed-reality environment at the second determined location.

13. The computer-implemented method according to claim 12, wherein a bounding box is determined by a comparison between the first and second real-world parts of the mixed-reality environment and the second-mixed-reality environment such that the scaling of the virtual object is consistent between them.

14. The computer-implemented method of claim 1, wherein performing the second scan includes performing the second scan based on the first scan.

15. The computer-implemented method according to claim 14, wherein the second scan is determined by the location of the first scan.

16. The computer-implemented method according to claim 15, wherein the second scan determines a topography of a real-world landscape of the location.

17. The computer-implemented method according to claim 16, further comprising creating a mesh relating to the topography.

18. The computer-implemented method according to claim 17, further comprising adapting the virtual object according to the mesh.

19. One or more non-transitory computer-readable media comprising one or more executable instructions which, when executed by an electronic device, causes the computer electronic device to carry out a method comprising:
    selecting a virtual object to be positioned in a mixed-reality environment, the virtual object having one or more conditions relating to the positioning of the virtual object;
    performing a first scan of a first real-world part of the mixed-reality environment;
    determining, based on the first scan, a first location to position the virtual object that satisfies the one or more conditions;
    scaling the virtual object based on the first location;
    positioning the virtual object in the mixed-reality environment at the determined location
    performing a second scan of second real-world part of the mixed-reality environment that is different to the first real-world part of the mixed-reality environment;
    determining, based on the second scan, a second location to position the virtual object in the second real-world part of the mixed-reality environment that satisfies the one or more conditions;
    scaling the virtual object based on the second location; and positioning the virtual object in the mixed-reality environment at the second location.

20. A system comprising:

a memory; and a processor configured to implement a method comprising:
- selecting a virtual object to be positioned in a mixed-reality environment, the virtual object having one or more conditions relating to the positioning of the virtual object;
- performing a first scan of a real-world part of the mixed-reality environment;
- determining, based on the first scan, a location to position the virtual object that satisfies the one or more conditions;
- performing a second scan of the real-world part of the mixed-reality environment;
- scaling, based on the location and the second scan, the virtual object; and
- positioning the virtual object in the mixed-reality environment at the location.

* * * * *